Feb. 15, 1955

H. W. RUBINSTEIN 2,702,364

VOLUME CONTROL UNIT

Filed July 16, 1948

INVENTOR.
HARRY W. RUBINSTEIN
BY
Arthur G. Connolly
ATTORNEY

2,702,364

VOLUME CONTROL UNIT

Harry W. Rubinstein, Fox Point, Wis., assignor to Herlec Corporation, Milwaukee, Wis., a corporation of Wisconsin Application July 16, 1948, Serial No. 39,104

9 Claims. (Cl. 323—74)

This invention relates to improvements in volume controls for electronic circuits.

It is desirable to combine as many as possible of the components entering into electronic circuits for the purpose of minimizing the number of connections to be made and the time required in assembling, the number of components for which mounting provisions must be made, and particularly for minimizing the space required for the various components. A well known type of volume control for a radio receiver includes an adjustable resistor and a switch actuated by an arm on the shaft for operating the movable resistor contact. However, it is necessary to employ a capacitor with the resistor and such capacitor has heretofore been a separate component requiring the making of connections thereto, the provision of mounting means for the capacitor and spacing of the capacitor from adjacent components in an electronic circuit.

It is, therefore, one object of the present invention to provide a capacitor for electronic circuits in which a relatively thin and flexible dielectric with conductive coatings formed thereon, is held in place against an insulating member by means supporting both the capacitor and the insulating member and forming one connection for the capacitor with other circuit components.

Another object of the invention is to provide a capacitor for electric circuits in which a disk-like capacitor with conductive coatings formed thereon, is pressed between an insulating member and a plate forming a portion of the means for connecting the capacitor in circuit and for mounting the capacitor in spaced relation with other circuit components.

Another object of the present invention is to provide a volume control for electronic circuits, combining a capacitor and a variable resistor as a single unit.

Another object of the invention is to provide a volume control unit of the type including an adjustable resistor and a capacitor, and employing only the terminals previously used for the resistor alone, and without material change in the prior structure of the resistor or increase in the space required for the unit as compared to the resistor alone.

Objects and advantages other than those above set forth will be apparent from the following description of my invention.

Generally, the present invention is embodied in a device comprising a member of insulating material with a resistor mounted thereon, the insulating member being substantially circular with an extension from the periphery of the member and having a central aperture therethrough. An electrically conductive bushing is fitted into the insulating member aperture and has located co-axially therewith a contact ring with a terminal extending radially therefrom to engage the insulating member extension. A specially formed capacitor is held between the insulating member and a metallic plate that is engaged by a shoulder of the bushing which is fixed in the insulating member by flanging the bushing end over a shoulder in the aperture of the insulating member. One of the capacitor plates is connected with one resistor terminal and the other capacitor plate is connected with the bushing.

A rotatable shaft extends through the bushing and has a piece of insulation fixed at one end thereof as a flange for mounting thereon resilient fingers making contact with the stationary resistor and the contact ring, a snap ring holding the shaft against axial displacement under the action of the resilient contact member. The structure described immediately above is inclosed in a casing on which is mounted a switch of the over-center toggle type. An actuator arm is fixed on the end of the shaft beyond the flange thereon and has lugs engageable with the switch and with an ear in the casing forming a stop limiting shaft movement.

One embodiment of the present invention is illustrated in the accompanying drawings in which.

Figures 1, 2, 3, 4, 5, 6:
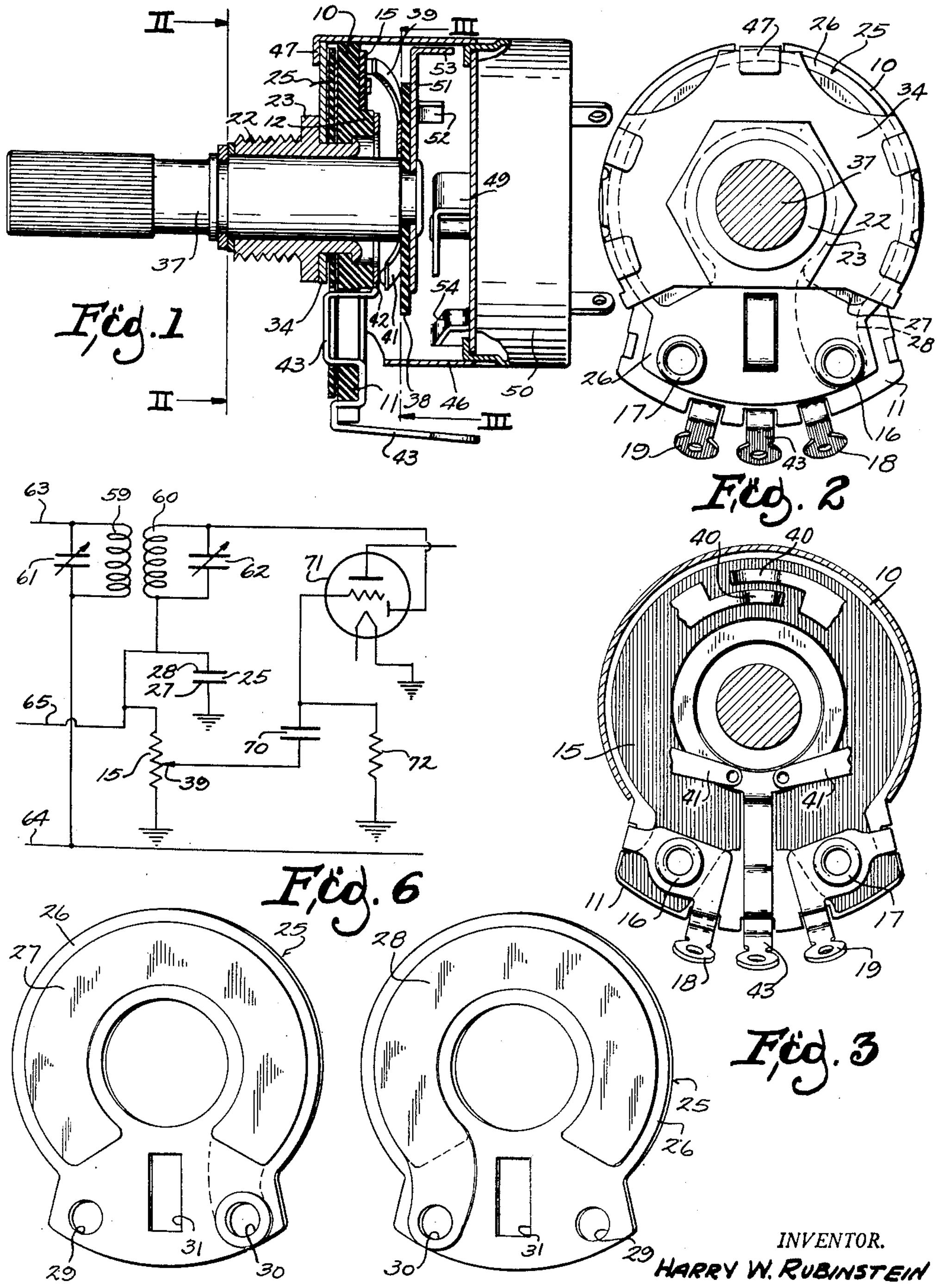
Fig. 1 is an axial cross section on substantially a central plane, of a volume control including a capacitor and a variable resistor and having a switch combined therewith.
Fig. 2 is a transverse section on the plane of line II—II of Fig. 1.
Fig. 3 is a transverse section on the plane of line III—III of Fig. 1.
Fig. 4 is a plan view of one side of the capacitor of the present invention.
Fig. 5 is a plan view of the other side of the capacitor of the present invention.
Fig. 6 is a diagram of a portion of a radio receiver circuit showing the connection therein of the variable resistor and the capacitor of the present combined unit.

Referring to the drawings, 10 designates a substantially cylindrical electrical insulating member with a lateral extension 11 therefrom and with a central aperture therethrough defined in part by a raised rim 12. A substantially annular resistor 15 extends partially around rim 12 and is held in contact with the insulating member 10 by eyelets 16 and 17 passing severally through the resistor ends and severally fixing terminals 18 and 19 on the insulating member. A conductive bushing 22 with a shoulder 23 extends into the insulating member aperture and is fixed therein by forming the bushing end over a shoulder in the aperture, the bushing being externally threaded for mounting on a base.

The bushing shoulder 23 also serves in part to hold a capacitor generally designated 25, against the insulating member 10. The capacitor comprises (see Figs. 4 and 5) a dielectric 26 of flexible material, such as mica, on which are formed conductive coatings 27 and 28 to provide the capacitor plates. Dielectric 26 is apertured as at 29 and 30 for passage of the eyelets 16, 17 therethrough and coating 28 is extended about aperture 30 to make contact with eyelet 16 and terminal 18 thus forming a conductive connection of the coating 28 with one end of the resistor 15. The dielectric 26 is also provided with an aperture 31 for a purpose to be described.

The capacitor is further held against insulating member 10 by a metallic holding plate 34 extending under bushing shoulder 23. Holding plate 34 thus conductively connects capacitor plate 27 with bushing 22 to connect such plate in circuit, i. e., to ground as will be described.

It will be seen that the dielectric is a thin and flexible member which is substantially annular with an extension from the periphery thereof. The extension has a plurality of apertures receiving the terminals of the resistor and the capacitor, one of such extension terminals being common to both such circuit components. The conductive coatings or capacitor plates are substantially annular except for interruption at and about the arcuate length of the dielectric extension, where the terminals are electrically joined therewith and are fixed in the insulating member. The thin and flexible capacitor is clamped against the insulating member by means including a metallic plate substantially covering the capacitor and protecting it against damage, such plate and a bushing also forming one joint terminal for the capacitor and for the resistor. Hence, the dielectric may be very thin and flexible without danger that the coatings thereon might be damaged in use. The metallic plate and the bushing forming the joint terminal for the resistor and the capacitor, fix the position of the capacitor against the insulating member, and support the entire unit in space.

A rotatable shaft 37 extends through and is journaled in bushing 22, one end of the shaft being split and splined to receive a knob for turning the shaft, all of which is well known and accordingly not shown. A piece of insulation 38 is fixed on one end of the shaft to form a flange-like extension therefrom. A conductive member 39 is fixed on the insulation flange 38 and is formed to provide two sets of resilient fingers 40 and 41 respectively in movable contact with resistor 15 and with a contact ring 42 on insulating member rim 12, both resistor and contact ring being concentric with the bushing 32. Contact ring 42 has a radial extension 43 therefrom which extends through an aperture in insulating member 10 and through aperture 31 in dielectric 26 and thus prevents displacement of the ring. The contact ring terminal 43 thus forms means for connecting the resistor contact member 39, 40, 41 in circuit as will be described.

The resistor, the contact ring and the movable contact therebetween, are enclosed in a casing or cover 46 which is generally cylindrical. The cover wall has ears 47 formed thereon to be bent over holding plate 34 to retain the cover in fixed position relative to bushing 22 and shaft 37.

A switch generally indicated at 49 is mounted in an enclosure 50 fixed on casing 46 in a predetermined relationship, the switch being of the well known over-center toggle type and not disclosed in detail. The switch is operable to open and close a circuit and is combined with the present unit only for convenience and cheapness in assembly and mounting. An actuator plate 51 is fixed on the end of the shaft 37 and has a lug 52 engageable with the switch and a lug 53 engageable with a stop 54 in the casing to limit rotation of the shaft and hence the movement of the contact member 39—41 to movement from end to end of the resistor.

The present construction forms a volume control particularly adapted for use in radio receivers, a portion of a circuit for such receiver being shown in Fig. 6. In such figure, 59 and 60 respectively designate the primary and secondary winding of a transformer respectively bridged by variable capacitors 61 and 62, the primary winding 59 and its capacitor 61 being connected in a power supply line 63, 64. The transformer secondary winding 60 and its capacitor 62 are connected with line 65 to other portions of the circuit and through a capacitor 25 with ground. Resistor 15 is also connected between the transformer secondary winding and ground. The movable resistor contact 39 is connected through a capacitor 70 to the grid of a tube 71 which is connected through a fixed resistor 72 with ground. The circuit illustrated is a well known form of the detector section of a radio receiver for amplitude modulated waves in which section the amplitude modulated signal impressed across the primary windings of transformer 59, 60 is demodulated and has its carrier frequency bypassed to ground via capacitor 25 resulting essentially in the desired signal alone being impressed by way of blocking condenser 70 to the grid of the detector 71. The variable resistor 15 constitutes a resistive load for the detected signal and provides the desired volume control. As indicated tabove the combining of capacitor 25 and resistor 15 in a single unit is distinctly advantageous.

It will thus be seen that the present invention combines a variable resistor type volume control with a fixed capacitor, in the simplest possible manner and merely by addition of the capacitor to an existing structure with no material change in the dimensions of such structure or in the method of manufacture thereof. Assembly of the insulating member with the resistor and the capacitor instead of with the resistor alone, involves only inconsequential increase in assembly time because attachment of one resistor terminal also secures attachment of one capacitor plate. No additional time whatever is required for attaching the other capacitor plate due to the fact that assembly of the bushing in the insulating member automatically connects such plate with the bushing which thus becomes one capacitor terminal and is readily connected in circuit.

As many apparently widely different embodiments of the invention may be made without departing from the spirit and scope hereof, it is to be understood that the invention is not limited to its specific embodiments except as defined in the appended claims.

I claim:

1. In a volume control unit for electronic circuits which unit has a housing and an operating shaft centrally disposed therein, the combination of a conductive bushing for receiving said shaft, an external shoulder formed on said bushing, a metallic plate fitted over said bushing and against said shoulder, said plate projecting beyond said shoulder to coact with said housing, a capacitor including a dielectric sheet with electrodes on opposite sides all mounted on said bushing adjacent said plate, an isolating member mounted on said bushing adjacent said capacitor, a resistor strip supported by said bushing, and clamping means securing said plate, capacitor, member and strip together in stacked rerelationship and electrically connecting one of said electrodes with one end of said resistor strip.

2. In a volume control unit having a resistance type potentiometer and a fixed capacitor in circuit relationship therewith, the improvement comprising a conductive bushing having an external flange intermediate its ends, an insulating member supported on and adjacent one end of said bushing, a plate supported on said bushing between said flange and said member, a fixed value capacitor including a dielectric disc with electrodes on opposite sides all supported on said bushing between said plate and said member, said potentiometer having a resistor strip supported on said member on the opposite side from said capacitor, and clamping means extending through said member to both structurally and electrically connect one electrode of said capacitor and said resistor strip and hold the assembly in stacked relationship.

3. In a volume control unit for electronic circuits, an insulating member, a potentiometer including a resistor having two ends and a variable intermediate tap, said potentiometer being mounted on one side of said member, a fixed capacitor mounted on the other side of said member, said capacitor including plural spaced electrodes and an intermediate dielectric, and clamping means for electrically joining one end of said resistor and one capacitor electrode and for structurally holding the resistor and capacitor on the member.

4. In a volume control unit for electronic circuits, an insulating member having a central aperture and a plurality of apertures adjacent the periphery thereof, a capacitor on one side of said member including plural electrodes and a dielectric having a configuration similar to that of said member, a resistor strip having a plurality of apertures mounted on the other side of said member, and rivet means for electrically joining one resistor end and one capacitor electrode through one of said plurality of apertures.

5. In a volume control unit for electronic circuits, a generally cylindrical metallic housing open at one end and having an inwardly directed flange at said end, a potentiometer within said housing including a resistor strip having two ends and a variable center tap, a rotatable shaft extending into said housing, means for fixing said tap to said shaft in insulated relation therefrom, a conductive bushing surrounding said shaft and extending into said housing, an outwardly projecting radial shoulder on said bushing located externally of said housing, a metallic plate on said bushing within said housing engaging the adjacent side of said shoulder and extending against said housing flange, a capacitor including a dielectric sheet with electrodes on opposite sides all mounted on said bushing with one electrode engaging said plate, an isolating member mounted on said bushing in engagement with the second of said capacitor electrodes, said resistor strip being mounted on the opposite side of said member from said capacitor and frictionally engaged by said tap, and clamping means connecting said plate, capacitor, member and strip in stacked relationship and electrically connecting said second capacitor electrode and one end of said strip.

6. In a radio receiver detector stage, a detector output circuit including a combined volume control potentiometer and capacitor assembly, said assembly having a metallic housing electrically connected to ground, an isolating member in said housing, a potentiometer enclosed in said housing and having an elongated resistor strip positioned on said isolating member and connected as a resistive load for the detected signal, a capacitor in the form of a dielectric sheet with conductive coatings forming electrodes on opposite sides held in said housing on said isolating member and having one electrode connected to one end of said resistor strip and the other electrode connected to said housing to provide a carrier frequency bypass, and means mechanically connecting said capacitor and resistor strip together on said isolating member.

7. In a volume control unit for electronic circuits, a generally cylindrical metallic housing open at one end and having an inwardly directed flange at said end, a potentiometer within said housing including a resistor strip having two ends and a variable center tap, a rotatable shaft extending into said housing, means for fixing said tap to said shaft in insulated relation therefrom, a conductive bushing surrounding said shaft and extending into said housing, an apertured isolating member mounted on said bushing, a capacitor comprising a thin centrally apertured dielectric sheet with conductive coating on opposite sides mounted on said bushing in side-by-side relationship with said isolating member, a pair of additional apertures in said dielectric sheet, one said conductive coating being in face engagement with said isolating member and extending through one of said dielectric apertures to the same side of said dielectric as the other coating, means conductively connecting said other coating with said housing, and means extending through each of said additional dielectric apertures for mechanically securing said capacitor to said isolating member and for electrically connecting one said capacitor coating and one end of said apertured resistor strip.

8. In a volume control unit including an electrically connected capacitor and resistor, an isolating member having a plurality of apertures, said resistor comprising an elongated strip apertured at each end and being positioned on one side of said isolating member, said capacitor comprising a thin dielectric sheet supporting a pair of conductive coatings on its opposed faces and also including a plurality of apertures, one said coating extending through one of said dielectric apertures to the opposite side of said dielectric, and means extending through each of said apertures for mechanically joining said capacitor isolating member and resistor strip in side-by-side relationship and for electrically connecting one end of said resistor strip and said one coating.

9. A volume control unit for electronic circuits, an isolating member having two planar faces, a potentiometer including an elongated planar resistor having two ends and a variable intermediate tap, said resistor being positioned on one face of said member, a capacitor having a pair of planar electrodes and a dielectric therebetween positioned on the other face of the member, and unitary means mechanically and electrically permanently joining one resistor end and one capacitor electrode for thereby holding the resistor and the capacitor on the member.

References Cited in the file of this patent

UNITED STATES PATENTS

| | | |
|---|---|---|
| 1,663,166 | Jones | Mar. 20, 1928 |
| 1,671,478 | Marbury | May 29, 1928 |
| 2,119,115 | Rohnfeld | May 31, 1938 |
| 2,348,693 | Minnium | May 9, 1944 |
| 2,464,376 | Cohen et al. | Mar. 15, 1949 |
| 2,464,377 | Cohen et al. | Mar. 15, 1949 |
| 2,493,199 | Khouri et al. | Jan. 3, 1950 |
| 2,496,095 | Kallmann | Jan. 31, 1950 |
| 2,505,980 | Mautner | May 2, 1950 |
| 2,523,856 | Baker | Sept. 26, 1950 |
| 2,549,424 | Carlson et al. | Apr. 17, 1951 |

FOREIGN PATENTS

| | | |
|---|---|---|
| 453,573 | Great Britain | Aug. 25, 1936 |